United States Patent Office 3,027,296
Patented Mar. 27, 1962

3,027,296
HALOGENATED PHOSPHORUS ESTERS
Richard R. Whetstone, Denver, Colo., assignor to Shell Oil Company, New York, N.Y., a corporation of Delaware
No Drawing. Filed May 28, 1956, Ser. No. 587,470
24 Claims. (Cl. 167—22)

This invention pertains to novel phosphorus esters. More particularly the present invention pertains to novel mixed esters of (1a) mono-basic acids of pentavalent phosphorus and (1b) hydrohalic acids with (2) polyhalogeno geminate diols, i.e., with hydrates of polyhalogeno aldehydes and ketones.

It is known to regard the aldehydes and ketones as being anhydrides of the corresponding geminate diols. Thus, an aldehyde or ketone of the general formula $R^1R^2C=O$ can be regarded as the anhydride of the corresponding geminate diol $R^1R^2C(OH)_2$. The geminate diols usually are not known in the free state. Some of the reactions of the aldehydes and ketones, however, can be formulated with the corresponding hydrate, or geminate diol, as an intermediate, especially when the reaction is one occurring in an aqueous medium. Some derivatives of geminate diols are known. For example, the known compound 1,1-diethoxypropane is the diethyl ether of the geminate glycol $CH_3CH_2CH(OH)_2$.

I have discovered in accordance with this invention that certain novel mixed esters of halogen-substituted geminate glycols can be prepared and I have further discovered that these novel esters are stable, useful organic compounds. More particularly, I have discovered and I provide in accordance with this invention the mixed esters of the beta-polyhalogeno geminate glycols in which mixed esters one of the pair of geminate hydroxyl groups of the beta-polyhagogeno geminate glycol is combined in ester linkage with a hydrohalic acid and the other of said pair of geminate hydroxyl groups is combined in ester linkage with a monobasic acid of pentavalent phosphorus. I have found these novel mixed esters to be stable organic compounds which can be easily prepared and if desired recovered in a relatively pure state, and further to have desirable and useful properties leading to applications of technical and commercial importance. These new phosphorus-containing mixed esters and one of their important uses form a principal aspect of the present invention.

The new esters provided by this invention are mixed esters of beta-polyhalogeno geminate glycols. The beta-polyhalogeno geminate glycols are polyhydric alcohols which contain a single pair of hydroxyl groups both of which are directly substituted on one and the same carbon atom, which carbon atom may be termed the alpha carbon atom. The alpha carbon atom is in turn directly bonded to a second carbon atom. This second carbon atom, which is referred to herein as the beta carbon atom, is directly substituted by a plurality of atoms of halogen which may be the same or different. The fourth valency of the alpha carbon atom is satisfied by a hydrogen atom, a hydrocarbon group, or a halogen-substituted hydrocarbon group. The hydrohalic acids are HI, HF, HCl and HBr. In the novel esters of the invention, one of the pair of geminate hydroxyl groups of the beta-polyhalogeno geminate diol is combined with the hydrohalic acid as the halide ester while the other of the same pair of geminate hydroxyl groups is combined in ester linkage with a monobasic acid of pentavalent phosphorus. Generically the new esters of the invention can be represented by the formula:

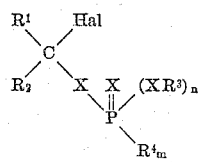

in which

represents the residue

of the beta-polyhalogeno geminate glycol

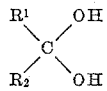

Hal represents an atom of halogen, and

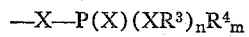

represents the residue $-X-P(X)(XR^3)_nR^4_m$ of the monobasic acid of pentavalent phosphorus

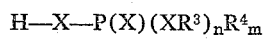

In these formulas $R^1-$ represents a halogen-substituted hydrocarbon group having a plurality of atoms of halogen directly substituted on the carbon atom from which the indicated free valency depends, $R^2$ represents a hydrogen atom, a hydrocarbon group, or a halogen-substituted hydrocarbon group, each X represents a divalent atom of a chalcogen element (oxygen or sulfur), and $R^3$ and $R^4$ represent organic radicals. The letters $n$ and $m$ each represent one of the numbers 0, 1 and 2, with the proviso that $n+m=2$. It is preferred that the hydrocarbon groups represented by each of $R^1$ and $R^2$ be low molecular weight hydrocarbon groups, particularly hydrocarbon groups containing from one to about ten carbon atoms each. It is further preferred that the organic radicals represented by each of $R^3$ and $R^4$ be low molecular weight hydrocarbon radicals containing up to about 15 carbon atoms each, particularly hydrocarbon radicals containing from one to ten carbon atoms each.

The beta-polyhalogeno geminate glycols represented by

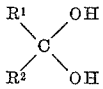

are exemplified by the halogen-substituted alkylidene glycols which have a plurality of atoms of halogen directly substituted on a single carbon atom in the beta position relative to the geminate hydroxyl groups and include, among others, the following: 2,2-dichloro-1,1-dihydroxyethane; 2,2-dibromo-1,1-dihydroxyethane; 2,2,2-trichloro-1,1-dihydroxyethane; 2,2,2-tribromo-1,1-dihydroxyethane; 2,2,3-trichloro-1,1-dihydroxypropane; 1,1,1-trichloro-2,2-dihydroxypropane; 1,1 - dichloro - 2,2-dihydroxypropane; 1,3,3 - trichloro - 2,2 - dihydroxypropane; 2,2-dichloro-3-bromo-1,1-dihydroxypropane; 2,2-dichloro-1,1-dihydroxybutane; 2,2,3 - tribromo - 1,1-dihydroxybutane; 2,2,3-trichloro-1,1-dihydroxybutane; 2,2,4-trichloro-1,1-dihydroxybutane; 1,1,1 - tribromo-2,2-dihydroxybutane; 1,1,1-trichloro-2,2-dihydroxybutane; 1,1,3-trichloro-2,2-dihydroxybutane; 1,1,3,3 - tetrachloro-2,2-dihydroxybutane; 2,2-dichloro - 1,1 - dihydroxypentane; 1,1,1 - tribromo-2,2-dihydroxypentane; 2,2,5-tribromo-3,3-dihydroxypentane; 3,3-dichloro - 2,2 - dihydroxypentane; 2,2 - dibromo-1,1-dihydroxyhexane; 1,1,1,6 - tetrabromo-2,2-dihydroxyheptane; 3,3-dibromo-2,2-dihydroxyheptane; and 1,1,1-trichloro-2,2-dihydroxyoctane. In addition to the preferred esters of the strictly aliphatic beta-polyhalogeno geminate glycols, the invention includes the corresponding esters wherein there are present on the residue of the geminate glycol one or more inert, or non-functional substituents which do not alter the essential functional characteristics of the beta-polyhalogeno geminate glycol. Such inert, non-functional substituents include the aryl groups, such as the phenyl group and the halogen-substituted phenyl group, the ether or alkoxy group, and the carbonyloxy group. Beta-polyhalogeno geminate glycols containing such inert or non-functional substituents mixed esters of which are included by the invention, are illustrated by the following: 2,2 - dichloro-1-phenyl-1,1-dihydroxypropane; 2,2 - dichloro - 1 - (p-chlorophenyl)-1,1-dihydroxyethane; 3,3 - dibromo - 1(2,4-dichlorophenyl)-2,2-dihydroxypropane; 1,1,1 - trichloro - 4 - methoxy-2,2-dihydroxybutane; 1,1 - dichloro-1-ethoxy-2,2-dihydroxyethane; 2,2-dichloro-3 - acetoxy - 1,1-dihydroxypropane; and 2,2 - dibromo-3-carbethoxy-1,1-dihydroxybutane.

The monobasic phosphorus acids contemplated in accordance with the present invention are those phosphorus-containing acids which contain but a single phosphorus atom wherein the phosphorus atom has a valency greater than three and has one, and only one, acidic function bonded thereto. Illustrative monobasic phosphorus acids, the phosphorus being at the valency level commonly referred to as the pentavalent state, include the esters of $H_3PO_4$ in which two and only two of the three hydroxyl groups on the phosphorus atom are combined in ester linkages, leaving the third hydroxyl group uncombined. The analogous acid diesters of the thiophosphoric acids are further examples of such monobasic phosphorus acids. Specific examples include the dialkyl acid phosphates, such as dimethyl acid phosphate, diethyl acid phosphate, dipropyl acid phosphate, ethyl propyl acid phosphate, dihexyl acid phosphate, dioctyl acid phosphate, didodecyl acid phosphate, and homologous and analogous dialkyl acid phosphates, and the alkyl aryl acid phosphates and diaryl acid phosphates, such as ethyl phenyl acid phosphate, butyl naphthyl acid phosphate, diphenyl acid phosphate, dicresyl acid phosphate, and di-p-chlorophenyl acid phosphate. Diesters of the thiophosphoric acids which are included by the class comprise, among others, O,O-dimethyl acid thiophosphate, O-ethyl-S-ethyl acid dithiophosphate, O,O-diisobutyl acid dithiophosphate, and O,O-diphenyl acid dithiophosphate. The monobasic acids of pentavalent phosphorus include in addition to the acid diesters of phosphoric acid and of the thiophosphoric acids the acid monoesters of the primary phosphonic acids, and the secondary phosphonic acids, as well as the thio analogs thereof. These monobasic phosphonic acids may be illustrated by the following: dimethanephosphonic acid; diethanephosphonic acid; diisobutanephosphonic acid; methane(ethane)phosphonic acid; bis - (p - nitrophenylmethane)phosphonic acid; butyl trichloromethanephosphonic acid; ethyl triphenylmethanephosphonic acid; propyl p-chlorobenzenephosphonic acid; diethane dithiophosphonic acid; debenzenedithiophosphonic acid; methyl benzenedithiophosphonic acid, and ethyl benzenethionophosphonic acid.

In the present specification and claims, the unqualified term phosphonic acid is employed in the meaning recommended by G. M. Kosolapoff in "Organo-Phosphorus Compounds," Wiley and Sons, 1950. The unqualified term "phosphonate" is used correspondingly.

The new mixed esters of the present invention can be prepared by various procedures and it will be understood that the invention is not intended to be restricted according to the particular synthesis which is employed. One method which may be employed involves reaction between an acid halide, such as the acid chloride, of the selected monobasic acid of pentavalent phosphorus and an alpha-polyhalogeno-substituted aldehyde or ketone. The method is described generically by the equation:

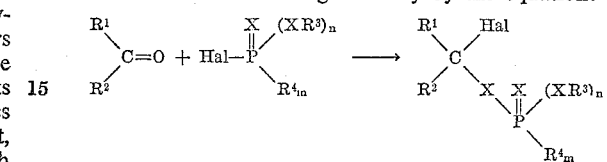

and is illustrated more specifically by the reaction between chloral and a dialkyl chlorophosphate to produce the mixed ester of hydrochloric acid and the dialkyl phosphoric acid with 1,1,1-trichloro-2,2-dihydroxy-ethane according to the equation:

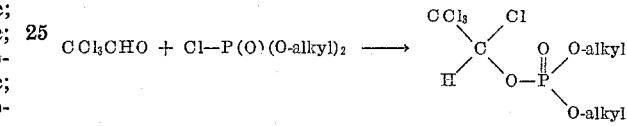

The mixed esters of this invention also can be prepared by halogenating beta - halogeno - substituted, alpha,beta-olefinically unsaturated esters of pentavalent phosphorus. Such unsaturated esters which may also be considered as beta-halovinyl esters of pentavalent phosphorus, have the structure represented by the formula:

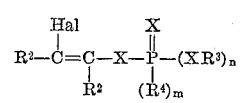

wherein the various symbols have the respective meanings given hereinbefore. Halogenation of this compound results in the addition of a mole of halogen at the double bonds of the halovinyl group.

The halovinyl esters of pentavalent phosphorus are conveniently prepared by the reaction of an alpha-polyhalogeno aldehyde or ketone with a neutral ester of a polybasic acid of trivalent phosphorus. This reaction is illustrated by the reaction between chloral and a trialkyl phosphite to produce beta,beta-dichlorovinyl dialkyl phosphate, according to the equation:

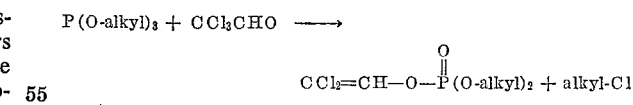

and by the reaction between alpha,alpha-dichloroacetophenone and diethyl benzene-phosphonite to produce beta-chloro-alpha-phenyl vinyl ethyl benzenephosphonate, according to the reaction:

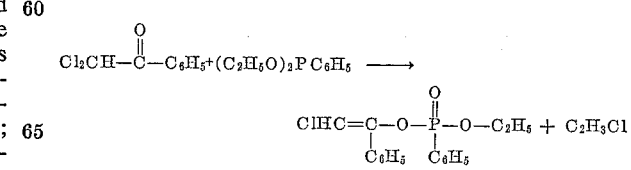

The method for preparing the beta-halovinyl esters by the reaction between the alpha-polyhalogeno aldehyde or ketone and the neutral ester of the acid of trivalent phosphorus is set out in detail in the article by Kharasch and Bengelsdorf, The Journal of Organic Chemistry, volume 20, pages 1356–1362 (1955). As is shown in this article, the reaction between the alpha-polyhalogeno aldehyde or alpha-polyhalogeno ketone and the neutral ester of the polybasic acid of trivalent phosphorus is effected by simply mixing the selected reactants and maintaining the mixture at reaction temperatures within the range of from about 10° C. to about 150° C. The reaction usually is exothermic and may be controlled by cooling of the reaction mixture, by use of an inert diluent, or both, or by slow addition of one reactant to the total amount of the other reactant. In some cases, moderate heating of the reaction mixture will be required to assure completion of the reaction.

The halogenation of the beta-halovinyl ester to produce the mixed ester of the beta-polyhalogeno geminate diol of the present invention can be carried out by direct treatment of the olefinically unsaturated halogen-substituted ester with a halogen under conditions conducive to additive halogenation of the olefinic bond. Chlorine, for example, can be introduced directly into the unsaturated ester, if desired in the presence of an inert solvent or diluent, such as a saturated hydrocarbon solvent, at temperatures of from about 0° C. to about 50° C. Bromine can be similarly added to produce the corresponding bromides. As the halogen there preferably is employed one of the group chlorine, and bromine. Halogenation catalysts may be used, such as light and/or metal halides represented by iron chloride, antimony salts, and the like. The treatment with the molecular halogen advantageously is continued until substantially the theoretical amount of halogen has been absorbed, and then discontinued. The mixed ester of the present invention can be recovered from the reaction mixture by conventional techniques, including without being limited to fractional distillation, extraction with selective solvents, crystallization, and the like.

The following examples illustrate certain of the novel esters of this invention. It will be appreciated that the examples are intended to be illustrative of the invention and that there are many other specific embodiments included within the invention.

EXAMPLE I

To a glass three-necked flask equipped with power driven stirrer, reflux condenser, and thermometer, 93 grams of chloral were added over a period of one-half hour to 107 grams of dimethyl benzenephosphonite. During the addition of the chloral the temperature of the mixture was held at 30° C. to 40° C. by cooling as required. Methyl chloride, formed as a by-product of the reaction, was distilled from the reaction mixture as rapidly as formed therein. Upon completion of the reaction the reaction mixture was stripped of low-boiling components by heating on the steam bath under 2 mm. mercury pressure leaving 168 grams of crude product. The crude product was molecularly distilled at 80° C. and $1\times10^{-4}$ mm. mercury pressure. Beta,beta-dichlorovinyl methyl benzenephosphonate was collected as a colorless distillate in the amount of 155 grams. Refractive index ($n$ 20/D) was found to be 1.5320. The beta,beta-dichlorovinyl methyl benzenephosphonate was analyzed for chlorine, carbon, and hydrogen. Found: 26.4% Cl, 39.4% C, 3.4% H. Calculated: 26.5% Cl, 40.47% C, and 3.39% H. Fifty-four grams of the beta,beta-dichlorovinyl methyl benzenephosphonate were chlorinated by treatment with gaseous chlorine at 30° C. to 40° C. The chlorination reaction was mildly exothermic and mild cooling was required. After 2 hours' chlorination the flow of chlorine was discontinued. No hydrogen chloride was evolved during the reaction. The mixture was then stripped by heating at 100° C. under about 2 mm. mercury pressure and then distilled in a falling film molecular still at 101° C. under $2\times10^{-5}$ mm. mercury pressure. A 14 gram portion of the mixed geminate diester of HCl and methyl benzenephosphonic acid with beta,beta,beta-trichloroethylidene glycol—i.e., alpha,beta,beta,beta-tetrachloroethyl methyl benzenephosphonate, was recovered. The structure of this ester can be described by the following formula:

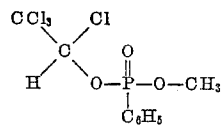

The distilled product was a moderately viscous liquid having a refractive index ($n$ 20/D) of 1.5373. The distillate fraction of the product was analyzed. Found: 32.1% C, 2.7% H, 9.3% P, 43.5% Cl. Calculated for $C_9H_9O_3PCl_4$: 32.0% C, 2.69% H, 9.17% P, 42.0% Cl.

EXAMPLE II

Trichloroacetaldehyde and triethyl phosphite were reacted in the apparatus described in Example I by slowly adding 89 grams of trichloroacetaldehyde to 100 grams of triethyl phosphite with vigorous agitation. Heat was generated by the reaction. The temperature of the reaction mixture was held at about 50° C. by regulation of the rate of addition of the trichloroacetaldehyde. Ethyl chloride which was formed in the reaction was allowed to volatilize from the reaction mixture as formed. The reaction mixture then was fractionally distilled. There were recovered 135 grams of beta,beta-dichlorovinyl diethyl phosphate boiling at 85.2° C. to 88.8° C. under 10 millimeters mercury pressure. Fifty grams of the beta,beta-dichlorovinyl diethyl phosphate were chlorinated by treatment with gaseous chlorine at about 30° C. until one mole of chlorine per mole of the unsaturated ester was absorbed. The resulting mixture was distilled in a falling film molecular still at 110.8° C. under $1\times10^{-5}$ millimeter mercury pressure. There were collected 22 grams of the mixed ester of HCl and diethyl acid phosphate with beta,beta,beta-trichloroethylidene glycol, alpha,beta,beta,beta-tetrachloroethyl diethyl phosphate. The structure of this mixed ester can be represented as follows:

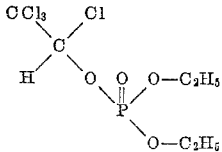

EXAMPLE III

Dichloroacetaldehyde, 120 grams, and triethyl phosphite, 176 grams, were reacted at a temperature of 45° C. to 60° C. in the manner illustrated in the preceding examples to produce beta-chlorovinyl diethyl phosphate. A 91.5 gram portion of the beta-chlorovinyl diethyl phosphate (B.P. 116°–118° C. under 10 mm. mercury pressure) was treated with gaseous chlorine at 25° C. until 22.5 grams of chlorine were taken up. The mixture then was stripped by heating to 117° C. under atmospheric pressure and the remaining 106 grams were molecularly distilled. There was collected a 39 milliliter distillate fraction of the mixed diester alpha,beta,beta-trichloroethyl diethyl phosphate having the formula:

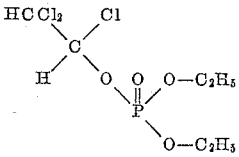

EXAMPLE IV

Trichloroacetaldehyde and trimethyl phosphite were reacted at 48° C. to 55° C. in the manner illustrated in the preceding examples to produce beta,beta-dichlorovinyl dimethyl phosphate, B.P. 83° C. under 2.3 mm. mercury pressure to 90° C. under 0.3 mm. mercury pressure. A 150 gram portion of the beta,beta-dichlorovinyl dimethyl phosphate was chlorinated at 20° C. to 40° C. until 51 grams of chlorine were absorbed. The resulting mixture was stripped by heating to 118° C. under 1.5 mm. mercury pressure and the remaining 168.5 grams of the reaction mixture were molecularly distilled in a falling film molecular still at 101° C. under 5×10⁻⁵ mm. mercury pressure. There were collected 119.5 grams of the mixed ester.

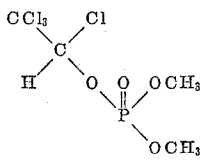

as a distillate which upon cooling in the still crystallized at about 40° C. The distillate fraction of the product was analyzed. Found: 16.4% C, 2.5% H, 10.8% P, 48.5% Cl. Calculated for $C_4H_7PO_4Cl_4$: 16.4% C, 2.4% H, 10.6% P, 48.6% Cl.

In addition to the mixed esters of hydrohalic acids and monobasic acids of pentavalent phosphorus with beta-polyhalogeno geminate glycols illustrated in the foregoing examples the invention includes the following mixed esters which form further specific embodiments of the invention and which can be prepared by the general method illustrated in the preceding examples: mixed esters of hydrohalic acids and dialkyl acid phosphates with polyhalogeno-substituted alkylidene glycols, such as the mixed esters alpha,beta-dibromo-beta,beta-dichloroethyl dibutyl phosphate, alpha,beta,beta-tribromoethyl diisopropyl phosphate, alpha,beta,beta-trichlorobutyl diethyl phosphate, alpha,beta,beta-tribromo-alpha-ethylpropyl, dimethyl phosphate, alpha,beta,beta-trichloroethyl methyl ethyl phosphate, alpha-methyl-alpha,beta,beta,beta-tetra-chloroethyl dioctyl phosphate, alpha,beta-diiodo-beta,beta-dichloroethyl dimethyl phosphate, and alpha,beta,beta-difluoro-beta,beta-dibromoethyl diisobutyl phosphate, which can be prepared by halogenation, using the appropriate halogen, of beta,beta-dichlorovinyl dibutyl phosphate, beta-bromovinyl diisopropyl phosphate, beta-ethyl-beta-chlorovinyl diethyl phosphate, alpha-ethyl-beta-bromo-beta-methylvinyl dimethyl phosphate, beta-chlorovinyl methyl ethyl phosphate, alpha-methyl-beta,beta-dichlorovinyl, dioctyl phosphate, beta,beta-dichlorovinyl dimethyl phosphate, and beta,beta-dibromovinyl diisobutyl phosphate, respectively; mixed esters of hydrohalic acids and acid aryl phosphates with polyhalogeno alkylidene glycols, such as alpha,beta,beta,beta-tetrachloroethyl diphenyl phosphate, alpha,beta,beta-tribromoethyl p-chlorophenyl ethyl phosphate, alpha,beta,beta-trichloropentyl diphenyl phosphate, alpha-ethyl-alpha,beta,beta,beta-tetrabromoethyl dicresyl phosphate, and alpha,beta,beta-trichlorooctyl diphenethyl phosphate, which correspondingly can be prepared by halogenation with the appropriate halogen of beta,beta-dichlorovinyl diphenyl phosphate, beta-bromovinyl p-chlorophenyl ethyl phosphate, beta-propyl-beta-chlorovinyl diphenyl phosphate, alpha-ethyl-beta,beta-dibromovinyl dicresyl phosphate, and beta-hexyl-beta-chlorovinyl diphenethyl phosphate, respectively; mixed esters of hydrohalic acids and secondary phosphonic acids and acid monoesters of primary phosphonic acids with polyhalogeno-substituted alkylidene glycols, such as alpha,beta,beta,beta-tetrachloroethyl methyl p-chlorobenzenephosphonate, alpha,beta,beta-tribromopropyl ethyl benzenephosphonate, alpha,beta,beta,beta-tetrabromoethyl isobutyl butanephosphonate, alpha,beta,beta-trichloroamyl phenyl benzenephosphonate, alpha,beta,beta,beta-tetrabromoethyl dibenzenephosphonate, and alpha-propyl-alpha,beta,beta,beta-tetrachloroethyl methyl benzenephosphonate, which can be prepared by halogenation with the appropriate halogen of beta,beta-dichlorovinyl methyl p-chlorobenzenephosphonate, beta-methyl-beta-bromovinyl ethyl benzenephosphonate, beta,beta-dibromovinyl isobutyl butanephosphonate, beta-propyl-beta-chlorovinyl phenyl benzenephosphonate, beta,beta-dibromovinyl dibenzenephosphonate, and alpha-propyl-beta,beta-dichlorovinyl methyl benzenephosphonate, respectively. Further examples of the novel mixed esters of the invention are provided by the mixed esters of hydrohalic acids and monobasic acids of pentavalent phosphorus with polyhalogeno-substituted alkylidene glycols which contain one or more chemically inert substituents on the residue of the glycol. Examples of these latter mixed geminate diesters include, among others: alpha-phenyl-alpha,beta,beta,beta-tetrachloroethyl diisopropyl phosphate, alpha-p-chlorophenyl-alpha,beta,beta-tribromoethyl diphenyl phosphate, beta-phenyl-alpha,beta,beta-tribromoethyl diethyl phosphate, beta-ethoxymethyl-alpha,beta,beta-trichloroethyl dibutyl phosphate, and beta-acetoxymethyl-alpha,beta,beta-trichloroethyl dimethyl phosphate. Examples of the mixed esters of the invention in which one or more of the atoms of divalent sulfur is or are directly bonded to the phosphorus atom of the residue of the monobasic acid of pentavalent phosphorus include the following: alpha,beta,beta,beta-tetrachloroethyl diethyl thionophosphate, alpha,beta,beta,beta-tetrabromoethyl dibutyl thionophosphate, alpha,beta,beta-trichloroethyl dimethyl trithiophosphate, alpha,beta,beta,beta-tetrachloroethyl diphenyl thionophosphate, and alpha,beta,beta-trichloroethyl butyl benzenethionophosphonate. The beta-halogeno-substituted alpha,beta-olefinically unsaturated esters of monobasic oxy-acids of pentavalent phosphorus mentioned above can be prepared from alpha-polyhalogen aldehydes and ketones and neutral esters of oxy-acids of trivalent phosphorus according to the method described by Kharasch and Bengelsdorf, J. Org. Chem., 20, 1356 (1955).

Of the novel mixed geminate diesters of the invention the mixed esters of the beta-polyhalogeno alkylidene glycols with a hydrohalic acid and a dialkyl acid phosphate are particularly valuable and are preferred. This preferred group can be defined by the formula

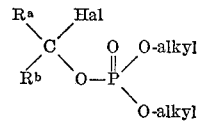

in which $R^a$ represents a halogen-substituted alkyl group having a plurality of atoms of halogen on the carbon atom in position No. 1 in said group, $R^b$ represents a member of the group consisting of hydrogen, alkyl and halogen-substituted alkyl, and Hal represents halogen and each alkyl represents an alkyl group. Of this preferred group, the esters in which the halogen-substituted alkyl groups represented by $R^a$ and $R^b$ and the alkyl groups represented by $R^b$, and the alkyl groups of the dialkyl acid phosphate each contain from one to about ten carbon atoms, inclusive, are especially desirable by reason of the availability of the necessary starting materials for their preparation as well as because of their high effectiveness as insecticides when used as hereinafter more fully disclosed. Of the mixed geminate diesters of the invention, preference is expressed for those in which the halogens are each selected from the group consisting of bromine and chlorine.

These preferred new esters also can be described by the formula

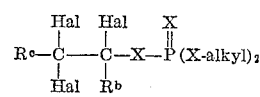

wherein $R^b$, Hal and X have the respective meanings given hereinbefore, the alkyl ester groups each contain from 1 to 10 carbon atoms and $R^c$ represents halogen or the same groups represented by $R^b$. Of particular interest are such compounds wherein:

(a) $R^c$ represents an alkyl group containing from 1 to about 10 carbon atoms and $R^b$ represents a hydrogen atom;

(b) $R^c$ represents a halogen atom and $R^b$ represents a hydrogen atom;

(c) $R^c$ and $R^b$ each represents a hydrogen atom.

A further preferred subgroup of these new compounds is those having the formula:

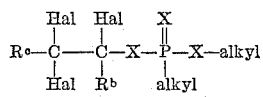

wherein each of the symbols has the meaning hereinbefore given for that symbol. Here, too, it is often desirable that $R^b$ represents a hydrogen atom.

One of the signal uses which I have discovered for the novel mixed esters of my invention is as insecticides. The novel mixed esters of the invention have been found to be characterized by a high toxicity towards insects, such that they can be used, alone or in combination with other toxic agents, for eradication of insects and similar pests and for protection against the ravages of insects. By the term insects, I intend to include not only the members of the class Insecta but also related or similar organisms belonging to allied classes of arthropods and including mites, ticks, spiders, wood lice, and the like.

For employing the novel mixed esters of polyhalogeno-substituted geminate glycols in combating insects and similar pests there can be employed the usual procedures familiar to those skilled in the art. For example, the agents may be sprayed or otherwise applied in the form of solutions or dispersions, or adsorbed on inert finely divided solids and applied as dusts. Solutions of the novel insecticides suitable for application by spraying, brushing, dipping, or the like, can be prepared using as the solvent any of the well-known horticultural carriers, such as kerosene, or similar light mineral oil distillates of intermediate viscosity and volatility. Adjuvants, such as spreading or wetting agents, may be included in the solutions, such as fatty acid soaps, rosin salts, saponins, gelatin, casein, or other proteinaceous material, or synthetic wetting agents of the type of sulfates of long-chain fatty alcohols, alkyl aryl sulfonates, long-chain alkyl sulfonates, phenol-ethylene oxide condensates, $C_{12}$ to $C_{20}$ amines and ammonium salts, and the like. The solution may be dispersed or emulsified in water and the resulting dispersion or emulsion applied as the spray. Solid carrier materials which can be employed include talc, bentonite, lime, gypsum, pyrophyllite, and the like inert solid diluents. The novel esters also may be applied as aerosols, as by dispersing them into the air by means of a compressed gas. The more volatile of the novel esters may be employed as fumigants, although they have only a low volatility and hence are less effective when employed in this manner. Certain of the toxic agents of the invention can also be applied in agricultural uses as systemic poisons. When used in this manner they are applied to the soil in the vicinity of the growing plant which it is desired to protect or directly to the plant, and are absorbed by the plant wherein they are distributed throughout the tissues with the result that the plant as a whole acquires toxicity to insects which consume its edible portions.

The concentration of the active ingredient to be used with the above carriers will be dependent upon many factors, such as the particular ester which is used, the carrier in or upon which it is incorporated, the method and conditions of application, the insect species to be controlled, etc., the proper consideration of these factors being within the skill of those versed in the art. In general, the toxic ingredients of this invention will be effective in concentrations from about 0.01% to about 0.5% by weight, based upon the total weight of the composition, although depending upon the circumstances as little as about 0.001% or as much as 2% or even more of the active ingredient may be employed.

The toxic agents of this invention may be employed at the sole toxic ingredient of the insecticidal composition or they may be employed in conjunction with other insecticidally active materials. Such other insecticidally active materials include, without being limited to, the naturally-occurring insecticides, such as pyrethrum, rotenone, sabidilla, and the like, as well as synthetic materials such as compounds of arsenic, lead, and/or fluorine; DDT, benzene hexachloride, thiodiphenylamine, cyanides, tetraethyl pyrophosphate, O,O-diethyl-O-p-nitrophenyl thiophosphate, azobenzene, and the like.

The following examples illustrate the preparation and use of the new insecticidal compositions containing the toxic agents of this invention, and the results obtainable through their use.

EXAMPLE V

Solutions of products prepared in examples described hereinbefore were prepared employing a neutral petroleum distillate boiling within the kerosene range as the solvent. The solutions were tested for toxicity against the 2-spotted mite (*Tetranychus bimaculatus*) by spraying groups of the insects under conditions which varied from one test to the other only with respect to the identity of the toxic agent and its concentration. Thus, in each of the several tests the same total volume of spray was used. The following table shows the percentage of the insects in each group killed under the test conditions after having been sprayed with the specified concentrations of various esters of this invention. The counts were made 24 hours after the application of the spray.

Table I

| Toxic Agent | Concentration, Percent w. | Percent Kill |
| --- | --- | --- |
| Alpha, beta, beta, beta-tetrachloroethyl diethyl phosphate | 0.2 | 87 |
| Alpha, beta, beta, beta-tetrachloroethyl dimethyl phosphate | 0.2 | 90 |
| Alpha, beta, beta, beta-tetrachloroethyl methyl benzenephosphonate | 1 | 90 |

EXAMPLE VI

Similar tests were carried out using the pea aphid (*Illinoia pisi*) as the test insect. The results shown in the following table were obtained.

Table II

| Toxic Agent | Concentration, Percent w. | Percent Kill |
| --- | --- | --- |
| Alpha, beta, beta, beta-tetrachloroethyl diethyl phosphate | 0.2 | 93 |
| Alpha, beta, beta, beta-tetrachloroethyl dimethyl phosphate | 0.05 | 84 |
| Alpha, beta, beta, beta-tetrachloroethyl methyl benzenephosphonate | 0.2 | 95 |

EXAMPLE VII

Similar tests were carried out using the common housefly (*Musca domestica*) as the test insect. The results shown in the following table were observed.

Table III

| Toxic Agent | Concentration, Percent w. | Percent Kill |
| --- | --- | --- |
| Alpha, beta, beta, beta-tetrachloroethyl diethyl phosphate | 0.1 | 89 |
| Alpha, beta, beta, beta-tetrachloroethyl dimethyl phosphate | .05 | 100 |
|  | .02 | 76 |
| Alpha, beta, beta, beta-tetrachloroethyl methyl benzenephosphonate | .05 | 91 |

EXAMPLE VIII

The $LD_{50}$ for active agents of this invention was determined using the 2-spotted mite, the pea aphid, and the housefly as the test insects. The $LD_{50}$ can be defined as the concentration of the toxic agent in a neutral solvent at which under standard test conditions a 50% mortality of the insects in each test is observed. The following results were obtained.

| Toxic Agent | LD₅₀ | | |
|---|---|---|---|
| | 2-Spotted Mite | Pea Aphid | Housefly |
| Alpha, beta, beta, beta-tetrachloroethyl diethyl phosphate | 0.04 | 0.03 | 0.02 |
| Alpha, beta, beta, beta-tetrachloroethyl dimethyl phosphate | 0.07 | 0.015 | 0.015 |
| Alpha, beta, beta, beta-tetrachloroethyl methyl benzenephosphonate | 0.16 | 0.05 | 0.03 |

This application is a continuation-in-part of my copending application Serial No. 274,283, filed February 29, 1952, now abandoned.

I claim as my invention:

1. A compound having the structure represented by the formula:

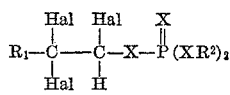

wherein $R^1$ represents an alkyl group containing from 1 to 10 carbon atoms, X represents a chalcogen element having an atomic number less than 20, Hal represents a halogen atom of the group consisting of chlorine and bromine and $R^2$ represents an alkyl group containing from 1 to 10 carbon atoms.

2. The compound of claim 1 in which Hal represents the chlorine atom.

3. A compound having the formula:

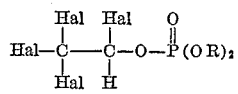

wherein R represents an alkyl group containing from 1 to 10 carbon atoms, and Hal represents a halogen atom of the group consisting of chlorine and bromine.

4. The compound of claim 3 in which Hal represents the chlorine atom.

5. The method of combating insects which comprises subjecting the insects to the action of a compound defined by claim 3.

6. Alpha,beta,beta,beta-tetrachloroethyl diethyl phosphate.

7. A compound having the formula:

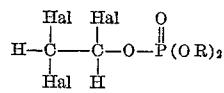

wherein R represents an alkyl group containing from 1 to 10 carbon atoms, and Hal represents a halogen atom of the group consisting of chlorine and bromine.

8. Alpha,beta,beta-trichloroethyl diethyl phosphate.

9. A compound having the formula:

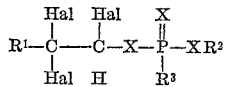

wherein $R^1$ represents an alkyl group containing from 1 to 10 carbon atoms, Hal represents a halogen atom of the group consisting of chlorine and bromine, X represents a chalcogen element having an atomic number less than 20, $R^2$ represents an alkyl group containing from 1 to 10 carbon atoms and $R^3$ represents an alkyl groups containing from 1 to 10 carbon atoms.

10. A compound having the formula:

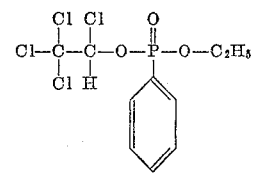

11. An insecticidal composition comprising essentially (a) as an active ingredient a compound having the structure represented by the formula:

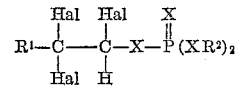

wherein $R^1$ represents an alkyl group containing from 1 to 10 carbon atoms, Hal represents a halogen atom of the group consisting of chlorine and bromine, X represents a chalcogen element having an atomic number less than 20 and $R^2$ represents an alkyl group containing from 1 to 10 carbon atoms, and (b) an inert diluent as insecticidal adjuvant therefor.

12. An insecticidal composition comprising essentially (a) as an active ingredient a compound having the formula:

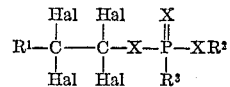

wherein $R^1$ represents an alkyl group containing from 1 to 10 carbon atoms, Hal represents a halogen atom of the group consisting of chlorine and bromine, X represents a chalcogen element having an atomic number less than 20, $R^2$ represents an alkyl group containing from 1 to 10 carbon atoms and $R^3$ represents an alkyl group containing from 1 to 10 carbon atoms, and (b) an inert diluent as insecticidal adjuvant therefor.

13. An insecticidal composition comprising essentially (a) as an active ingredient from about 0.001% to about 2% by weight of the composition of a compound having the formula:

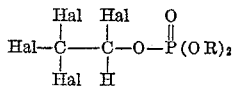

wherein R represents an alkyl group containing from 1 to 10 carbon atoms and Hal represents a halogen atom of the group consisting of chlorine and bromine, and (b) an inert non-phytotoxic diluent as insecticidal adjuvant therefor.

14. The method of combating insects which comprises subjecting the insects to the action of a compound having the formula:

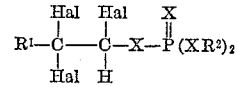

wherein $R^1$ represents an alkyl group containing from 1 to 10 carbon atoms, Hal represents a halogen atom of the group consisting of chlorine and bromine, X represents a chalcogen element having an atomic number less than 20 and $R^2$ represents an alkyl group containing from 1 to 10 carbon atoms.

15. The method of combating insects which comprises subjecting the insects to the action of a compound having the structure represented by the formula:

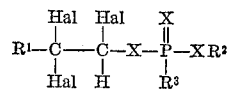

wherein $R^1$ represents an alkyl group containing from 1 to 10 carbon atoms, Hal represents a halogen atom of the group consisting of chlorine and bromine, X represents a chalcogen element having an atomic number less than 20, $R^2$ represents an alkyl group containing from 1 to 10 carbon atoms and $R^3$ represents an alkyl group containing from 1 to 10 carbon atoms.

16. A compound having the structure represented by the formula:

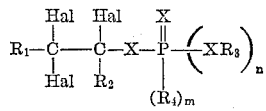

wherein $R_1$ repersents a member of the class consisting of the hydrogen atom, the phenyl group, the halogen atoms and organic groups containing from 1 to 10 carbon atoms of the class consisting of the alkyl groups, halogen-substituted alkyl groups, alkoxy groups, alkoxyalkyl groups, alkanoylalkyl groups and carboalkoxyalkyl groups, $R_2$ represents a member of the class consisting of the hydrogen atom, the phenyl group, halo-phenyl groups, and organic groups containing from 1 to 10 carbon atoms of the class consisting of the alkyl groups, halogen-substituted alkyl groups, aralkyl groups and alkoxyalkyl groups, $R_3$ represents a hydrocarbon group containing from 1 to 10 carbon atoms of the class consisting of the alkyl groups, aryl groups, aralkyl groups and alkaryl groups, $R_4$ represents an organic group containing from 1 to 10 carbon atoms of the class consisting of the phenyl group, halo-phenyl groups, alkyl groups and halogen-substituted alkyl groups, each X represents a chalcogen element having an atomic number less than 20, Hal represents a halogen atom, and letters $n$ and $m$ each represents a whole number selected from the group consisting of 0, 1 and 2, with the proviso that $n+m=2$ and the further proviso that each halogen in the compound is selected from the group consisting of chlorine and bromine.

17. An insecticidal composition comprising essentially (a) as an active ingredient a compound define by claim 16, and (b) an inert diluent as insecticidal adjuvant therefor.

18. The method of combating insects which comprises subjecting the insects to the action of a compound defined by claim 16.

19. A compound having the formula:

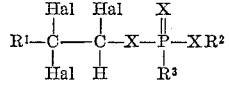

wherein $R^1$ represents an alkyl group containing from 1 to about 10 carbon atoms, Hal represents a halogen atom of the group consisting of chlorine and bromine, X represents a chalcogen element having an atomic number less than 20, $R^2$ represents an alkyl group containing from 1 to 10 carbon atoms and $R^3$ the phenyl group.

20. As new compositions of matter, esters of acids of pentavalent phosphorus of the formula:

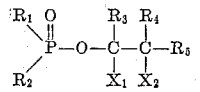

wherein $X_1$ and $X_2$ are selected from the group consisting of chlorine and bromine; $R_1$ and $R_2$ are selected from the group of organic radicals consisting of phenyl and lower alkoxy radicals; $R_3$ is selected from the group consisting of hydrogen and lower alkyl radicals; $R_4$ is selected from the group consisting of chlorine and bromine; and $R_5$ is selected from the group consisting of hydrogen, chlorine, bromine and lower alkyl radicals.

21. As new compositions of matter, esters of phosphoric acid of the formula:

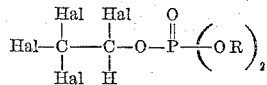

wherein R represents a lower alkyl group and Hal represents a halogen atom of the group consisting of chlorine and bromine.

22. As new compositions of matter, esters of phosphoric acid of the formula:

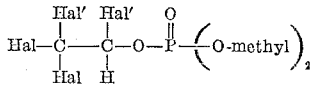

wherein Hal and Hal' each represents a halogen atom of the group consisting of chlorine and bromine, with both of Hal' being the same halogen.

23. As new compositions of matter, esters of phosphoric acid of the formula:

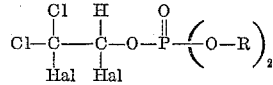

wherein both of Hal are the same halogen and are selected from the group consisting of chlorine and bromine, and R represents a lower alkyl group.

24. As new compositions of matter, esters of phosphoric acid of the formula:

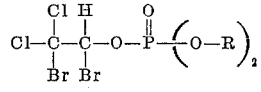

wherein R represents a lower alkyl group.

References Cited in the file of this patent
UNITED STATES PATENTS
2,573,568    Harman et al. _____ Oct. 18, 1951